United States Patent Office 3,773,887
Patented Nov. 20, 1973

3,773,887
S-(α-ALKOXYCARBONYLBENZYL)-DITHIOPHOSPHORIC ACID ESTER AMIDES
Claus Stolzer, Wuppertal-Vohwinkel, and Ingeborg Hammann, Cologne, Germany, assignors to Bayer Aktiengesellschaft, Leverkusen, Germany
No Drawing. Filed Oct. 5, 1971, Ser. No. 186,813
Claims priority, application Germany, Oct. 10, 1970, P 20 49 812.8
Int. Cl. A01n 9/36; C07f 9/16, 9/24
U.S. Cl. 260—941
7 Claims

ABSTRACT OF THE DISCLOSURE

S-(α-alkoxycarbonylbenzyl)-dithiophosphoric acid ester amides of the general formula

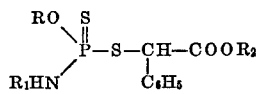
(I)

in which

R is an alkyl or alkoxyalkyl radical with up to 6 carbon atoms in each alkyl group,
$R_1$ is an alkyl or alkenyl radical with up to 6 carbon atoms, and
$R_2$ is an alkyl radical with up to 4 carbon atoms, which possess insecticidal and acaricidal properties.

---

The present invention relates to and has for its objects the provision of particular new S-(α-alkoxycarbonylbenzyl)-dithiophosphoric acid ester amides, i.e. O-alkyl- or -alkoxyalkyl-S-(α-alkoxycarbonylbenzyl) - dithiophosphoric acid ester N-alkyl- or -alkenyl-amides which possess insecticidal and acaricidal properties, active compositions in the form of mixtures of such compounds with solid and liquid dispersible carrier vehicles, and methods for producing such compounds and for using such compounds in a new way especially for combating pests, e.g. insects and acarids, with other and further objects becoming apparent from a study of the within specification and accompanying examples.

It is known from German published specification 1,300,932 that O,O-dialkyl-S-(α-alkoxycarbonylbenzyl)-dithiophosphoric acid esters, e.g. O,O-dimethyl- (Compound A) or O,O-diethyl-S-(α-ethoxycarbonylbenzyl)-dithiophosphoric acid ester (Compound B), possess insecticidal and acaricidal activity.

The present invention provides S-(α-alkoxycarbonylbenzyl)-dithiophosphoric acid ester amides of the formula

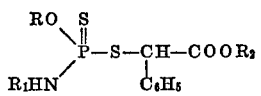
(I)

in which

R is an alkyl or alkoxyalkyl radical with up to 6 carbon atoms in each alkyl group,
$R_1$ is an alkyl or alkenyl radical with up to 6 carbon atoms, and
$R_2$ is an alkyl radical with up to 4 carbon atoms.

These compounds have been found to exhibit a strong insecticidal and acaricidal activity.

The invention also provides a process for the production of a S-(α-alkoxycarbonylbenzyl)-dithiophosphoric acid ester amide of the Formula I in which a salt of an O-alkyl-N-alkyl-dithiophosphoric acid ester amide of the formula

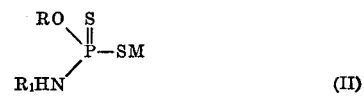
(II)

is reacted with an α-halo-α-phenylacetic acid alkyl ester of the formula

(III)

in which

R, $R_1$ and $R_2$ have the meanings stated above,
Hal is a halogen atoms, preferably bromine or chlorine, and
M is an alkali metal, an alkaline earth metal equivalent or an optionally alkyl substituted ammonium equivalent.

Surprisingly, the S-(α-alkoxycarbonylbenzyl)-dithiophosphoric acid ester amides according to the invention show a substantially better insecticidal and acaricidal activity than the known O,O-dialkyl-S-(α-alkoxycarbonylbenzyl)-dithiophosphoric acid esters of analogous constitution and the same direction of activity. The substances according to the invention therefore represent a genuine enrichment of the art.

If α-bromo-α-phenyl-acetic acid ethyl ester and the sodium salt of O-ethyl-N-iso-propyl-dithiophosphoric acid ester amide are used as starting materials, the reaction course can be represented by the following formula scheme:

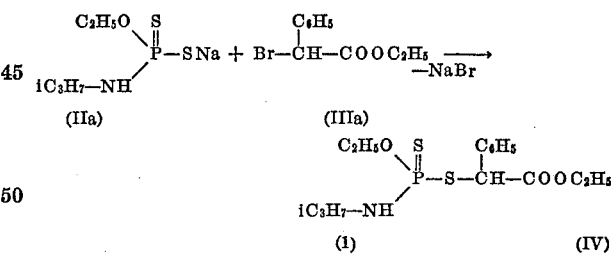

Preferably, R is for a straight or branched-chain lower alkyl radical with up to 4 carbon atoms, such as methyl, ethyl, iso- or n-propyl, n-, iso-, sec.- or tert.-butyl, or for an alkoxyalkyl radical with 1–4 carbon atoms in each alkyl portion, such as methoxymethyl, methoxyethyl, methoxypropyl, ethoxymethyl, ethoxyethyl, butoxymethyl, butoxyethyl, and the like; $R_1$ preferably is a lower alkyl radical as exemplified above or a lower alkenyl radical with up to 4 carbon atoms, such as vinyl, propenyl or butenyl; $R_2$ is preferably a lower alkyl radical with up to 3 carbon atoms.

As examples of suitable salts of dithiophosphoric acid ester amides of Formula II, there are mentioned in particular:

The alkali metal salts, alkaline earth metal salts or optionally alkyl-substituted ammonium salts of O-methyl-N-methyl-, O-methyl-N-propyl-, O-methyl-N-isopropyl-O - ethyl - N - methyl-, O-ethyl-N-ethyl-, O-ethyl-N-isopropyl-, O-butyl-N-ethyl-, O-methoxy-methyl-N-methyl-, O-ethoxymethyl-N-ethyl-, O-methoxyethyl-N-propyl-, O-propoxymethyl - N - methyl-, O - methyl -N - propenyl-, O-ethyl-N-propenyl-, O-ethyl-N-buten(2)yl-, O-propyl-N-propenyl- and O-methyl-N-buten(2)yl-dithiophosphoric acid ester amide.

The haloacetic acid derivatives of the Formula III are known and can be prepared according to known methods. Some of the salts of the dithiophosphoric acid ester amides (II) have been described; they can also be obtained according to a new process from O-alkyl-N-monoalkyl-thionophosphoric acid ester amide halides and hydrogen sulfide under alkaline conditions.

The process is preferably carried out with the use of suitable solvents or diluents. As such, partically all inert organic solvents are suitable. These include, above all, aliphatic and aromatic optionally chlorinated hydrocarbons, such as benzene, toluene, xylene, benzine, methylene chloride, chloroform, carbon tetrachloride, chlorobenzene; ethers, such as e.g. diethyl and dibutyl ether, dioxane; further, ketones, for example acetone, methylethyl, methyl-iso-propyl and methylisobutyl ketone; also, nitriles, such as acetonitrile and propionitrile and alcohols, such as methanol, ethanol and, iso-propanol. In some cases water may also serve as solvent or diluent.

The reaction temperature can be varied within a fairly wide range. In general, the reaction is carried out at about 0 to 120° C., preferably at about 15 to 40° C.

The reaction is, in general, carried out at normal pressure.

For carrying out the process, the starting materials may generally be used in equimolar porportions. An excess of one or other of the reaction components brings no substantial advantages. The reaction is preferably carried out in the presence of one of the above-mentioned solvents at the temperatures stated; afer several hours stirring, the reaction mixture is worked up as usual.

The substances according to the invention are obtained in the form of colorless or slightly colored, viscous, water-insoluble oils which in many cases cannot be distilled without decomposition but can, by so-called "slight distillation," i.e. prolonged heating at moderately elevated temperatures under reduced pressure, be free from the last volatile components and in this way purified. For their characterization, the refractive index is especially useful.

As already mentioned, the new S-(α-alkoxycarbonyl-benzyl)-dithiophosphoric acid ester amides are distinguished by an outstanding insecticidal and acaricidal effectiveness against crop pests, hygiene pests and pests of stored products. They possess a good activity against both sucking and eating insects, and mites (Acarina). At the same time, they exhibit low phytotoxicity.

For these reasons, the compounds according to the invention can be used with success as pesticides in crop protection and the protection of stored products, as well as in the hygiene field.

To the sucking insects contemplated herein there belong, in the main, aphids (Aphidae) such as the green peach aphid (*Myzus persicae*), the bean aphil (*Doralis fabae*), the bird cherry aphid (*Rhopalosiphum padi*), the pea aphid (*Macrosiphum pisi*) and the potato aphil (*Macrosiphum solanifolii*), the currant gall aphid (*Cryptomyzus korschelti*), the rosy apple aphid (*Sappaphis mali*), the mealy plum aphid (*Hyalopterus arundinis*) and the cherry black-fly (*Myzus cerasi*) in addition, scales and mealybugs (Coccina), for example the oleander scale (*Aspidiotus hederae*) and the solt scale (*Lecanium hesperidum*) as well as the grape mealybug (*Pseudoccus maritimus*); thrips (Thysanoptera), such as *Hercinothrips femoralis*, and bugs, for example the beet bug (*Piesma quadrata*), the red cotton bug (*Dysdercus intermedius*), the bed bug (*Cimex lectularius*), the assassin bug (*Rhodnius prolixus*) and Chagas' bug (*Triatoma infestans*) and, further, cicades, such as *Euscelis bilobatus* and *Nephotettix bipunctatus* and the like.

In the case of the biting insects contemplated herein, above all there should be mentioned butterfly caterpillars (Lepidoptera) such as the diamond-back moth (*Plutella maculipennis*), the gypsy moth (*Lymantria dispar*), the browntail moth (*Euproctis chrysorrhoea*) and tent caterpillar (*Malacosma neustria*); further, the cabbage moth (*Mamestra brassicae*) and the cutworm (*Agrotis segetum*), the large white butterfly (*Pieris brassicae*), the small winter month (*Cheimatobia brumata*), the gree oak tortrix moth (*Tortrix viridana*), the fall arymworm (*Laphygma frugiperda*) and cotton worm (*Prodenia litura*), the ermine moth (*Hyponomeuta padella*), the Mediterranean flour moth (*Ephesia kühniella*) and greater wax moth (*Galleria mellonella*); and the like.

Also to be classed with the biting insects contemplated herein are beetles (Coleopera), for example the granary weevil (*Sitophilus granarius=Calandra granaria*), the Colorado bettle (*Leptinotarsa decemlineata*), the dock beetle (*Gastrophysa viridula*), the mustard beetle (*Phaedon cochleariae*), the blossom beetle (*Meligethes aeneus*), the raspberry bettle (*Byturus tomomentosus*), the bean weevile (*Bruchidius=Acanthoscelides obtectus*), the leather beetle (*Dermestes frischi*), the khapra beetle (*Trogoderma granarium*), the flour beetle (*Tribolium castaneum*), the northern corn billbug (*Calandra or Sitophilus zeamais*), the drugstore beetle (*Stegobium paniceum*), the yellow mealworm (*Tenebria molitor*) and the saw-toothed grain beetle (*Oryzaephilus surinamensis*), and also species living in the soil, for example wireworms (*Agriotes* spec.) and larvae of the cockchafer (*Melolontha melonontha*); cockroaches, such as the Germany cockroach (*Blattella germanica*), American cockroach (*Periplaneta americana*), Madeira cockroach (*Leucophaea* or *Rhyparobia maderae*), oriental cockroach (*Blatta orientalis*), the giant cockroach (*Blaberus giganteus*) and the black giant cockroach (*Blaberus fuscus*) as well as *Henschoutedenia flexivitta*; further, Orthopetra, for example the house cricket (*Acheta domesticus*); termites such as the eastern subterranean termite (*Reticulitermes flavipes*) and Hymenoptera such as ants, for example the garden ant (*Lasius niger*); and the like.

The Diptera contemplated herein comprise essentially the flies, such as the vinegar fly (*Drosophila melanogaster*), the Mediterranean fruit fly (*Ceratitis capitata*), the house fly (*Musca domestica*), the little house fly (*Fannia canicularis*), the black blow fly (*Phormia regina*) and bluebottle fly (*Calliphora erythrocephala*) as well as the stable fly (*Stomoxys calcitrans*); further, gnats, for example mosquitoes such as the yellow fever mosquito (*Aedes aegypti*), the northern house mosquito (*Culex pipiens*) and the malaria mosquito (*Anopheles stephensi*); and the like.

With the mites (Acari) contemplated herein there are classed, in particular, the spider mites (Tetranychidae) such as the two-spotted spider mite (*Tetranychus telarius=Tetranychus altahaea* or *Tetranychus urticae*) and the European red mite (*Paratetranychus pilosus=Panonychus ulmi*), gall mites, for example the black currant gall mite (*Eriophyes ribis*) and tarsonemids, for example the broad mite (*Hemitarsonemus latus*) and the cyclamen mite (*Tarsonemus pallidus*); finally, ticks, such as the relapsing fever tick (*Ornithodorus moubata*); and the like.

When applied against hygiene pests and pests of stored products, particularly flies and mosquitoes, the novel products are also distinguished by an outstanding residual activity on wood and clay, as well as a good stability to alkali on limed substrates.

The active compounds according to the instant invention can be utilized, if desired, in the form of the usual formulations or compositions with conventional inert (i.e. plant compatible or herbicidally inert) pesticide diluents or extenders, i.e. diluents, carriers or extenders of the type usable in conventional pesticide formulations or compositions, e.g. conventional pesticide dispersible carrier vehicles such as gases, solutions, emulsions, suspensions, emulsifiable concentrates, spray powders, pastes, soluble powders, dusting agents, granules, etc. These are prepared in known manner, for instance by extending the active compounds with conventional pesticide dispersible liquid diluent carriers and/or dispersible solid carriers optionally with the use of carrier vehicle assistants, e.g. conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: aerosol propellants which are gaseous at normal temperatures and pressures, such as Freon; inert dispersible liquid diluent carriers, including inert organic solvents, such as aromatic hydrocarbons (e.g. benzene, toluene, xylene, alkyl naphthalenes, etc.), halogenated, especially chlorinated, aromatic hydrocarbons (e.g. chlorobenzenes, etc.), paraffins (e.g. petroleum or mineral oil fractions), cycloaliphatic hydrocarbons (e.g. cyclohexane), chlorinated aliphatic hydrocarbons (e.g. methylene chloride, chloroethylenes, etc.), alcohols (e.g. methanol, ethanol, propanol, butanol, glycol, etc.), amines (e.g. ethanolamine, etc.), ethers or esters of such alcohols, ether-alcohols (e.g. glycol monomethyl ether, etc.), ketones (e.g. acetone, methyl ethyl ketone, methyl isobutyl ketone, cyclohexanone, etc.), strongly polar solvents such as amides (e.g. dimethyl formamide, etc.), sulfoxides (e.g. dimethyl sulfoxide, etc.), acetonitrile and/or water; as well as inert dispersible finely divided solid carriers, such as ground natural minerals (e.g. kaolins, clays, alumina, silica, chalk, i.e. calcium carbonate, talc, attapulgite, montomorillonite, kieselguhr, etc.) and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emulsifying agents, such as non-ionic and/or anionic emulsifying agents (e.g. polyethylene oxide esters of fatty acids, polyethylene oxide ethers of fatty alcohols, alkyl sulfates, alkyl sulfonates, aryl sulfonates, etc., and especially alkyl arylpolyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other acaricides and insecticides, or fungicides, bactericides, nematocides, rodenticides, herbicides, fertilizers, growth-regulating agents, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95% by weight, and preferably 0.5–90% by weight, of the mixture, whereas carrier composition mixtures suitable for direct application or field application generally contemplate those in which the active compound is present in an amount substantially between about 0.0001–10% preferably 0.01–1%, by weight of the mixture. Thus, the present invention contemplates over-all compositions which comprise mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally between about 0.0001–95%, and preferably 0.01–95%, by weight of the mixture.

The active compounds can also be used in accordance with the well known ultra-low-volume process with good success, i.e. by applying such compound if normally a liquid, or by applying a liquid composition containing the same, via very effective atomizing equipment, in finely divided form, e.g. average particle diameter of from 50–100 microns, or even less, i.e. mist from, for example by airplane crop spraying techniques. Only up to at most about a few liters/hectare are needed, and often amounts only up to about 15 to 1000 g./hectare, preferably 40 to 600 g./hectare, are sufficient. In this process it is possible to use highly concentrated liquid compositions with said liquid carrier vehicles containing from about 20 to about 95% by weight of the active compound or even the 100% active substance alone, e.g. about 20–100% by weight of the active compound.

Furthermore, the present invention contemplates methodes of selectively killing, combating or controlling pests, e.g. insects and acarids, which comprises applying to at least one of correspondingly (a) such insects, (b) such acarids, and (c) the corresponding habitat thereof, i.e. the locus to be protected, a correspondingly combative or toxic amount, i.e. an insecticidally or acaricidally effective amount, of the particular active compound of the invention alone or together with a carrier vehicle as noted above. The instant formulations or compositions are applied to the usual manner, for instance by spraying, atomizing, vaporizing, scattering, dusting, watering, squirting, sprinkling, pouring, fumigating, and the like.

It will be realized, of course, that the concentration of the particular active compound utilized in admixture with the carrier vehicle will depend upon the intended application. Therefore, in special cases it is possible to go above or below the aforementioned concentration ranges.

The unexpected superiority and outstanding activity of the particular new compounds of the present invention are illustrated, without limitation, by the following examples:

EXAMPLE 1

Myzus test (contact action)

Solvent: 3 parts by weight acetone
Emulsifier: 1 part by weight alkylarylpolyglycol ether To produce a suitable preparation of active compound, 1 part by weight of the active compound is mixed with the stated amount of solvent containing the stated amount of emulsifier and the concentrate is diluted with water to the desired concentration.

Cabbage plants (*Brassica oleracea*) which have been heavily infested with peach aphids (*Myzus persicae*) are sprayed with the preparation of the active compound until dripping wet.

After the specified periods of time, the degree of destruction is determined as a percentage: 100% means that all the aphids are killed whereas 0% means that none of the aphids are killed.

The active compounds, the concentrations of the active compounds, the evaluation times and the results can be seen from the following Table 1.

TABLE 1.—MYZUS TEST

| Active compound | Concentration of active compound in, percent | Degree of destruction in, percent after a day |
|---|---|---|
| (A) 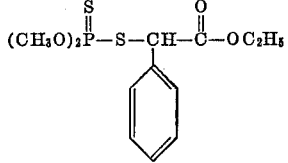 (known). | 0.1<br>0.01<br>0.001 | 98<br>98<br>0 |
| (B) 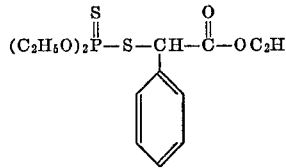 (known). | 0.1<br>0.01<br>0.001 | 100<br>100<br>40 |
| (1) 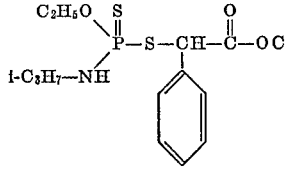 | 0.1<br>0.01<br>0.001 | 100<br>100<br>80 |

EXAMPLE 2

Phaedon larvae test

Solvent: 3 parts by weight acetone
Emulsifier: 1 part by weight alkylaryl polyglycol ether To produce a suitable preparation of active compound, 1 part by weight of the active compound is mixed with the stated amount of solvent containing the stated amount of emulsifier, and the concentrate is diluted with water to the desired concentration.

Cabbage leaves (*Brassica oleracea*) are sprayed with the preparation of the active compound until dripping wet and then infested with mustard beetle larvae (*Phaedon cochleariae*).

After the specified periods of time, the degree of destruction is determined as a percentage: 100% means that all the beetle larvae are killed. 0% means that none of the beetle larvae are killed.

The active compounds, the concentration of the active compound, the times of evaluation and the results can be seen from the following Table 2.

TABLE 2.—PHAEDON LARVAE TEST

| Active compound | Concentration of active compound in, percent | Degree of destruction in, percent after 3 days |
|---|---|---|
| (2) 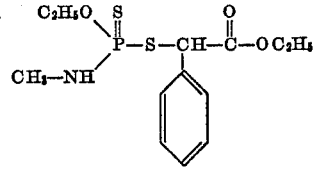 | 0.1<br>0.01 | 100<br>100 |
| (1) 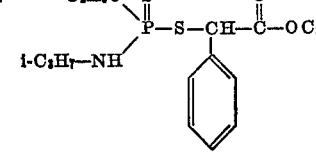 | 0.1<br>0.01<br>0.001 | 100<br>100<br>85 |
| (3) 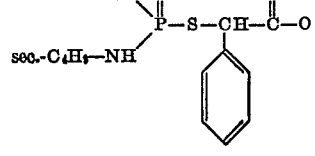 | 0.1<br>0.01<br>0.001 | 100<br>100<br>60 |
| (4) 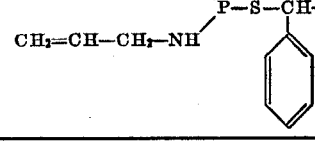 | 0.1<br>0.001 | 100<br>100 |

EXAMPLE 3

Tetranychus test

Solvent: 3 parts by weight acetone
Emulsifier: 1 part by weight alkylarylpolyglycol ether To produce a suitable preparation of active compound, 1 part by weight of the active compound is mixed with the stated amount of solvent containing the stated amount of emulsifier and the concentrate so obtained is diluted with water to the desired concentration.

Bean plants (*Phaseolus vulgaris*), which have a height of approximately 10–30 cm., are sprayed with the preparation of the active compound until dripping wet. These bean plants are heavily infested with spider mites (*Tetranychus urticae*) in all stages of development.

After the specified periods of time, the effectiveness of the preparation of active compound is determined by counting the dead mites. The degree of destruction thus obtained is expressed as a percentage: 100% means that all the spider mites are killed whereas 0% means that none of the spider mites are killed.

The active compounds, the concentrations of the active compounds, the evaluation times and the results can be seen from the following Table 3.

The preparation of the novel compounds is illustrated in the following examples.

EXAMPLE 4

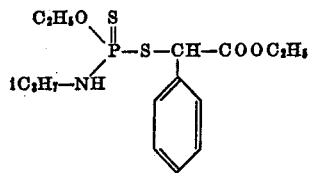

(1)

To a solution of 48.6 g. (0.22 mole) of the sodium salt of O-ethyl-N-iso-propyl-dithiophosphoric acid ester amide in 200 ml. of acetonitrile there are added dropwise, at room temperature, 48.6 g. (0.20 mole) of α-bromo-α-phenyl-acetic acid ethyl ester. The reaction proceeds exothermically. The mixture is stirred overnight at room temperature and then poured into water; it is taken up in benzene, the organic phase is washed with water, it is dried over sodium sulfate, filtered, and the filtrate is concentrated. O-ethyl-N-isopropyl-S-(α - ethoxycarbonylbenzyl)-dithiophosphoric acid ester amide is obtained as a yellowish-brown oil of the refractive index $n_D^{21}$=1.5460. The yield is 60.0 g. (83.1% of theory).

TABLE 3.—TETRANYCHUS TEST

| Active compound | Concentration of active compound in, percent | Degree of destruction in, percent after 2 days |
|---|---|---|
| (A) 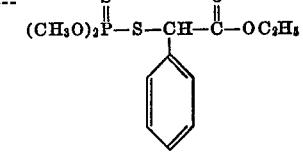 (known). | 0.1 | 20 |
| (B) 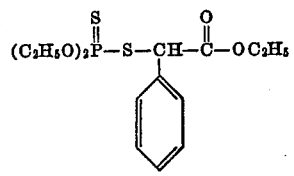 (known). | 0.1<br>0.01 | 80<br>0 |
| (1) 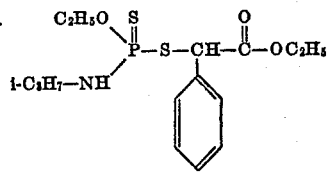 | 0.1<br>0.01 | 9<br>40 |

EXAMPLE 5

Analogously, the following compounds are obtained:

| Formula | Refractive index |
|---|---|
| (2) C₂H₅O\P(=S)—S—CH—COOC₂H₅ / CH₃—NH, phenyl | $n_D^{27.5}$=1.5549 |
| (3) C₂H₅O\P(=S)—S—CH—COOC₂H₅ / sec.-C₄H₉—NH, phenyl | $n_D^{27}$=1.5400 |

| Formula | | Refractive index |
|---|---|---|
| (4) | 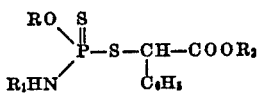 | $n_D^{27.5}=1.5512$ |
| (5) | 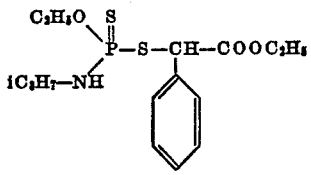 | $n_D^{27.5}=1.5392$ |

It will be appreciated that the instant specification and examples are set forth by way of illustration and not limitation, and that various modifications and changes may be made without departing from the spirit and scope of the present invention.

What is claimed is:

1. S-(α - alkoxycarbonylbenzyl)-dithiophosphoric acid ester amides of the formula:

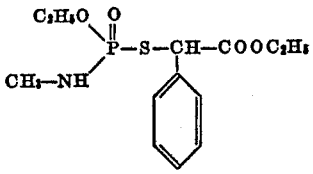

in which

R is an alkyl or alkoxyalkyl radical with up to 6 carbon atoms in each alkyl group, $R_1$ is an alkyl or alkenyl radical with up to 6 carbon atoms, and $R_2$ is an alkyl radical with up to 4 carbon atoms.

2. Compounds according to claim 1 in which R is an alkyl or alkoxyalkyl radical with up to 4 carbon atoms in each alkyl portion; $R_1$ is an alkyl or alkenyl radical with up to 4 carbon atoms; and $R_2$ is an alkyl radical with up to 3 carbon atoms.

3. A compound according to claim 1, wherein such compound is O-ethyl-N-isopropyl-S - (α - ethoxycarbonylbenzyl)-dithiophosphoric acid ester amide of the formula $C_2H_5O$, $S$
P—S—CH—COOC$_2$H$_5$
iC$_3$H$_7$—NH    C$_6$H$_5$ 4. A compound according to claim 1, wherein such compound is O-ethyl-N-methyl - S - (α - ethoxycarbonylbenzyl)-dithiophosphoric acid ester amide of the formula $C_2H_5O$, $O$
P—S—CH—COOC$_2$H$_5$
CH$_3$—NH   C$_6$H$_5$ 5. A compound according to claim 1, wherein such compound is O-ethyl-N-sec.-butyl-S - (α - ethoxycarbonylbenzyl)-dithiophosphoric acid ester amide of the formula

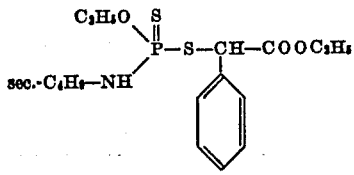

6. A compound according to claim 1, wherein such compound is O-ethyl-N-allyl-S-(α-ethoxycarbonylbenzyl)-dithiophosphoric acid ester amide of the formula

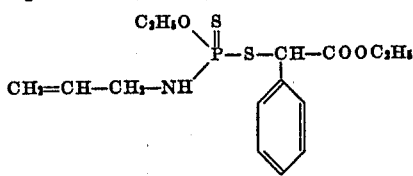

7. A compound according to claim 1, wherein such compound is O-methoxyethyl-N-isopropyl - S - (α-ethoxycarbonylbenzyl)-dithiophosphoric acid ester amide of the formula

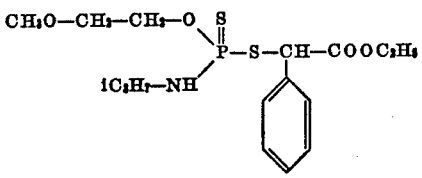

References Cited
UNITED STATES PATENTS

| | | | |
|---|---|---|---|
| 3,689,605 | 9/1972 | Santi | 260—941 |
| 3,014,955 | 12/1961 | Beriger | 260—941 |
| 3,019,250 | 1/1962 | Kayser et al. | 260—941 X |
| 3,121,105 | 2/1964 | McConnell et al. | 960—941 |

LEWIS GOTTS, Primary Examiner

R. L. RAYMOND, Assistant Examiner

U.S. Cl. X.R.

260—979; 424—212

PO-1050
(5/69)

UNITED STATES PATENT OFFICE
CERTIFICATE OF CORRECTION

Patent No. __3,773,887__          Dated __November 20, 1973__

Inventor(s) __Claus Stolzer and Ingeborg Hammann__

It is certified that error appears in the above-identified patent and that said Letters Patent are hereby corrected as shown below:

Col. 2, line 22, change "atoms" to --atom

Col. 3, lines 66 and 68, correct spelling of "aphid".

Col. 4, line 6, correct spelling of "cicadas" ;

line 16, change "gree" to --green--;

line 17, correct spelling of "armyworm";

line 38, correct spelling of "melolontha".

Col. 6, line 28, correct spelling of "methods";

line 38, change "to" to --in--.

Col. 9, Table 3, Compound (1) under heading "Degree of Destruction in, percent after 2 days", change "9" to --99--.

Signed and sealed this 10th day of September 1974.

(SEAL)
Attest:

McCOY M. GIBSON, JR.          C. MARSHALL DANN
Attesting Officer              Commissioner of Patents